US012607208B2

(12) United States Patent
Blomaard et al.

(10) Patent No.: US 12,607,208 B2
(45) Date of Patent: Apr. 21, 2026

(54) INFLATABLE FIBER REINFORCED BAG

(71) Applicant: Taniq NC B.V., Rotterdam (NL)

(72) Inventors: Sören Blomaard, Schiedam (NL); Coen Ten Herkel, Rotterdam (NL)

(73) Assignee: Taniq NC B.V., Rotterdam (NL)

(*) Notice: Subject to any disclaimer, the term of this patent is extended or adjusted under 35 U.S.C. 154(b) by 0 days.

(21) Appl. No.: 18/867,951

(22) PCT Filed: May 18, 2023

(86) PCT No.: PCT/NL2023/000008
§ 371 (c)(1),
(2) Date: Nov. 21, 2024

(87) PCT Pub. No.: WO2023/229453
PCT Pub. Date: Nov. 30, 2023

(65) Prior Publication Data

US 2025/0145430 A1 May 8, 2025

(30) Foreign Application Priority Data

May 25, 2022 (NL) ...................................... 1044340

(51) Int. Cl.
*F15B 15/10* (2006.01)
*B66F 3/35* (2006.01)

(52) U.S. Cl.
CPC .............. *F15B 15/103* (2013.01); *B66F 3/35* (2013.01)

(58) Field of Classification Search
CPC ................................ F15B 15/103; B66F 3/35
See application file for complete search history.

(56) References Cited

U.S. PATENT DOCUMENTS

| | | | | | |
|---|---|---|---|---|---|
| 2,839,440 | A | * | 6/1958 | Pfeiffer | B29D 22/023 156/193 |
| 3,705,224 | A | * | 12/1972 | Neff | B29C 66/532 264/296 |
| 5,938,179 | A | | 8/1999 | Beukers et al. | |
| 2020/0139654 | A1 | | 5/2020 | Sauerbier et al. | |

FOREIGN PATENT DOCUMENTS

| | | | | | |
|---|---|---|---|---|---|
| EP | 0626338 | A1 * | 11/1994 | | B29C 53/564 |
| NL | 2014930 | B1 * | 2/2017 | | B66F 7/085 |
| WO | WO2018/233803 | A1 | 12/2018 | | |

* cited by examiner

*Primary Examiner* — Michael Leslie
(74) *Attorney, Agent, or Firm* — Ballard Spahr LLP

(57) ABSTRACT

This invention is directed to an inflatable fibre reinforced bag having a flat and generally round shape in uninflated condition, comprising at least one interior elastomer layer, a fibre reinforcement structure and an outer elastomer layer, wherein a reinforcement structure consisting of continuously wound reinforcement fibers running from pole to pole substantially closes said poles.

13 Claims, 7 Drawing Sheets

INFLATABLE FIBER REINFORCED BAG

CROSS-REFERENCE TO RELATED APPLICATIONS

This application is a U.S. National Phase Patent Application of International Patent Application No. PCT/NL2023/000008, filed May 18, 2023, which claims priority to NL Application No. 1044340, filed May 25, 2022, the entire contents of each of which are hereby incorporated herein by reference in their entirety for all purposes.

Inflatable fiber reinforced bags can be implemented as so-called air lifting bags that are primarily used in low insertion height situations with heavy weight needing to be lifted such as buildings, bridges, vehicle or structural rescue, load shifting, heavy truck or aircraft recovery and machinery moving.

Lifting bags traditionally have a rectangular, preferably square geometry. They are manufactured by manually folding several layers of fabric reinforced sheets of unvulcanized rubber into a square shape, which is then vulcanized by compressing the unvulcanized ('green') product in a press between two moulding plates. No mandrel is used during the manufacturing process. When these square shaped lifting bags are inflated their flat square shape transforms into a 'pillow' shape.

To improve some inefficiencies found in such traditional square shape lifting bags, such as, for example, stress concentrations in the corner areas, a round lifting bag was developed as described in EP 0 626 338 A1. The round lifting bag of EP 0 626 338 A1 is designed as an isotensoid structure, which means that all reinforcement cords are equally tensioned when the lifting bag is inflated in its free (unloaded) condition. The isotensoid structure described in EP 0 622 338 A1 is obtained by geodetically winding the reinforcement cords over a predetermined shape, defined by $$V=\frac{2*\pi*Y_0^3}{3}*\sqrt{\frac{(q^2+q+1)^5}{(q^2+q)^3*(2q+1)}}*\int_0^{\frac{\pi}{2}}\sqrt{1-\frac{q-1}{2q+1}*\sin^2\theta}*d\theta$$

wherein $q$ is defined as $$q=\frac{Y_u^2}{Y_i^2}$$

$Y_o$ is the diameter of the pole opening, Yu is the smallest radius of the optimal part of the pressure vessel, and Yi is the largest radius of the optimal part of the pressure vessel, resulting in a three-dimensional mandrel having the shape of a flattened cylinder with continuous, curved edges, a squeezed sphere like the shape of a Gouda-cheese. For the purpose of manufacturing the inflatable bag the material layers, such as elastomer and fiber reinforcement layers, are arranged against an outer side of the mandrel, wherein a shape of the mandrel defines a shape of the body cavity of the body in question. After or during a forming process, in which for instance a certain degree of curing of the layer of material takes place, the mandrel is removed from the body.

It is noted that patent publication EP 2 960 033 A2 describes a design and use of such three-dimensional mandrel, assembled from a set of mutually cohesive body parts, the body parts being mutually releasable and the body parts being removable via the opening.

An advantage of the lifting bag from EP 0 626 338 A1 compared to the traditional square shape bags is that the isotensoid reinforcement structure provides a better force distribution along the reinforcement structure, resulting in a more efficient material usage and a better force-stroke (lifting) curve.

In the manufacturing process described in EP 0 626 338 A1 the reinforcement cords, which are applied through automated fiber winding, are wound on a three-dimensional mandrel with the shape as defined by the equation mentioned above, while the manufacturing of the traditionally square shaped bags, which are manufactured by manually folding of fabric reinforced rubber sheets, does not require a mandrel. Further, in the process described in EP 0 626 338 A1 also the elastomer layer(s) are applied on the three-dimensional mandrel rendering the process more complex. The opening for removing the three-dimensional mandrel from the body, after or during the forming process, is created in a process of winding the reinforcement fibers up to a certain distance from the pole, thereby also creating a polar opening in the reinforcement structure of the hollow body. As a result, the round shape lifting bags produced by the method of EP 0 626 338 A1 need additional closing elements, e.g. metal flanges, to close these polar openings in the hollow fabric reinforced elastomer body. However, the use of such closing flanges increases the thickness and weight of the product which is undesired from a product performance point of view.

Patent publication WO 2018/233803 A1 describes a production method for manufacturing of a round shaped lifting bag comprising an inner elastomer layer, a fabric reinforcement layer and an outer elastomer outer layer. According to WO 2018/233803 A1 the reinforcement layer comprises a single- or multilayer, prefabricated two-dimensional fiber-reinforcing layer in the form of a tube or a tubular structure which is pulled over the entire arrangement of the core like a 'stocking'. According to the description the reinforcement 'stocking' could be pulled over the entire core, potentially also covering the pole, such that no polar opening exists. Whereas the method described in WO 2018/233803 A1 does not require the winding of continuous fiber in a certain winding geometry including the necessary apparatus design, as would be required for EP 0 622 338 A1, and the polar areas could potentially by covered as well, the resulting reinforcement structure does not have the efficiency of the reinforcement structure as obtained by the method of EP 0 622 338 A1 obtained through reinforcement cords following geodesic paths running from pole to pole.

It is an object of the present invention to provide an improved inflatable fiber reinforced bag, having the advantages of the efficient reinforcement structure as described in EP 0 622 338 A1, and also having the advantages of having substantially closed polar openings such that no additional closing elements are required.

It is an object of the present invention to provide an improved inflatable fiber reinforced bag. In particular, it is an object of the present invention to provide a bag that has a lower insertion height. Thereto, according to an aspect of the invention, the fiber reinforcement structure being formed by continuous winding of fibers between opposite poles of the bag is substantially closing both poles. Since there are no substantial polar openings in the fiber reinforced rubber structure, no metal closing flanges are required anymore. In the absence of metal closing flanges, the insertion height of the bag is considerably lower and the overall weight is lower, thereby improving the bag performance. In case the mandrel remains in the bag, then its material and construction cannot have a hindering effect during operational use of the bag.

Further advantageous embodiments according to the invention are described in the following claims.

The invention will now be further elucidated on the basis of a number of exemplary embodiments and an accompanying drawing. In the drawing:

FIG. 5A shows a schematic view of a fiber reinforcement structure having a rotation symmetric geometry and an outer contour of the bag having a rotation symmetric geometry.

FIG. 5B shows a schematic view of a fiber reinforcement structure having a rotation symmetric geometry and an outer contour of the bag having a non-rotation symmetric geometry having radially extending parts, providing handles for manipulation of the bag.

FIG. 5C shows a schematic view of a fiber reinforcement structure having a rotation symmetric geometry and an outer contour of the bag having a rectangular geometry.

FIG. 5D shows a schematic view of a fiber reinforcement structure having a geometry which comprises a combination of circular sections and straight sections and an outer contour of the bag having a rotation symmetric geometry.

FIG. 5E shows a schematic view of a fiber reinforcement structure having a non-rotation symmetric geometry having the shape of a hexagon with rounded corners and an outer contour of the product having a non-rotation symmetric geometry having the shape of a hexagon.

FIG. 5F shows a schematic view of a fiber reinforcement structure having a geometry which comprises a combination of circular sections and straight sections and an outer contour of the product having a rectangular geometry.

It is noted that the figures show merely preferred embodiments according to the invention. In the figures, the same reference numbers refer to equal or corresponding parts.

Figure 1A:
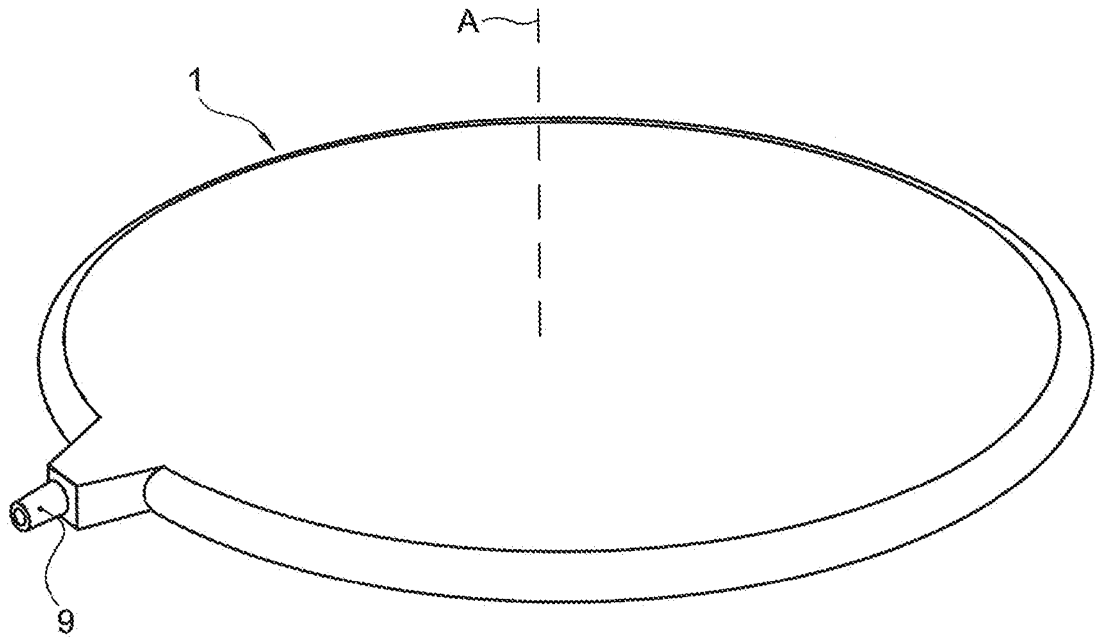
FIG. 1A shows a schematic perspective view of an exemplary embodiment of a fiber reinforced inflatable bag according to the invention in a deflated state.

FIG. 1A shows a schematic perspective view of an exemplary embodiment of a fiber reinforced inflatable bag 1 according to the invention. The bag 1 is provided with an input port 9 having a valve for inflating and deflating, respectively, the bag 1. In FIG. 1A, the bag is in a deflated state. The bag 1 has a generally rotationally symmetric geometry with respect to a rotation axis of symmetry A and can be used as a so-called lift-bag for lifting heavy objects such as collapsed buildings, e.g. in emergency situations. Generally, a lift-bag can be brought from a deflated state to an inflated state by pressurizing the bag 1. Similarly, by de-pressurizing the bag 1 can be brought from an inflated state to a deflated state. Generally, the bag can be stored and transported in its deflated state while the bag may be generating a lifting force when positioning and pressurizing the bag.

Figure 1B:
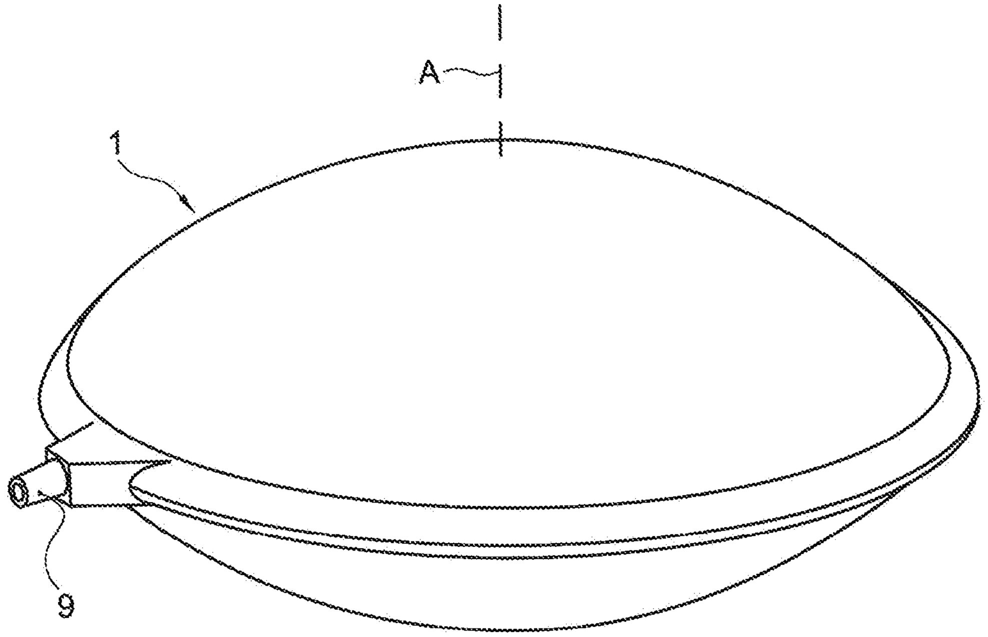
FIG. 1B shows the bag of FIG. 1A in an inflated state.

FIG. 1B shows a schematic perspective view of the bag 1 in an inflated state. Again, the bag 1 has a generally rotationally symmetric geometry with respect to the rotation axis of symmetry A.

Figure 2A:
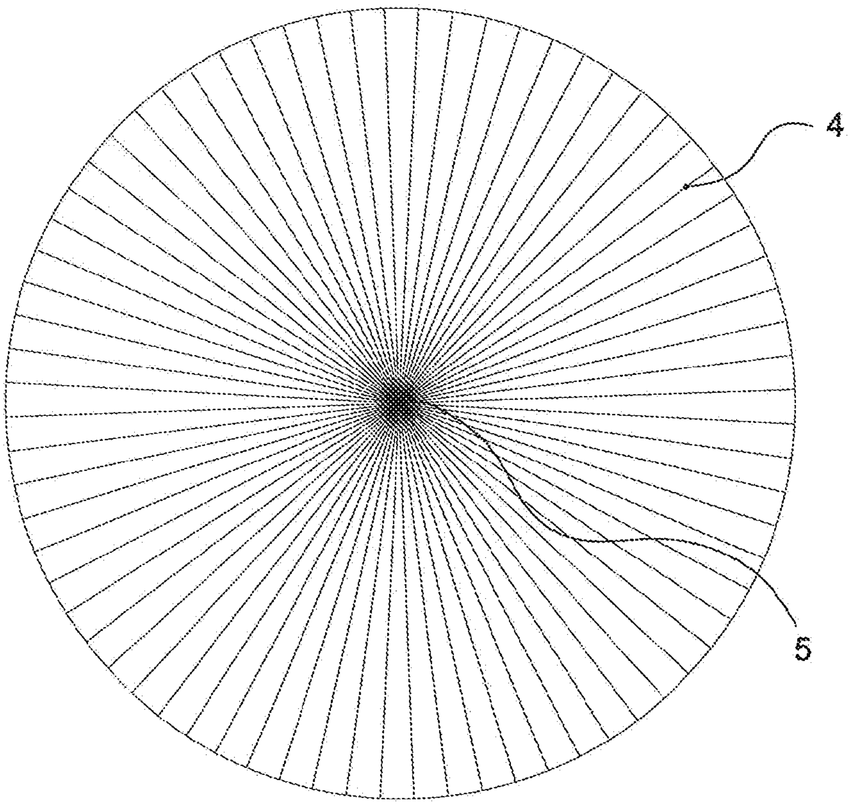
FIG. 2A shows a schematic top view of a fiber reinforcement structure according to the invention showing fibers running from pole to pole substantially closing said poles.
Figure 2B:
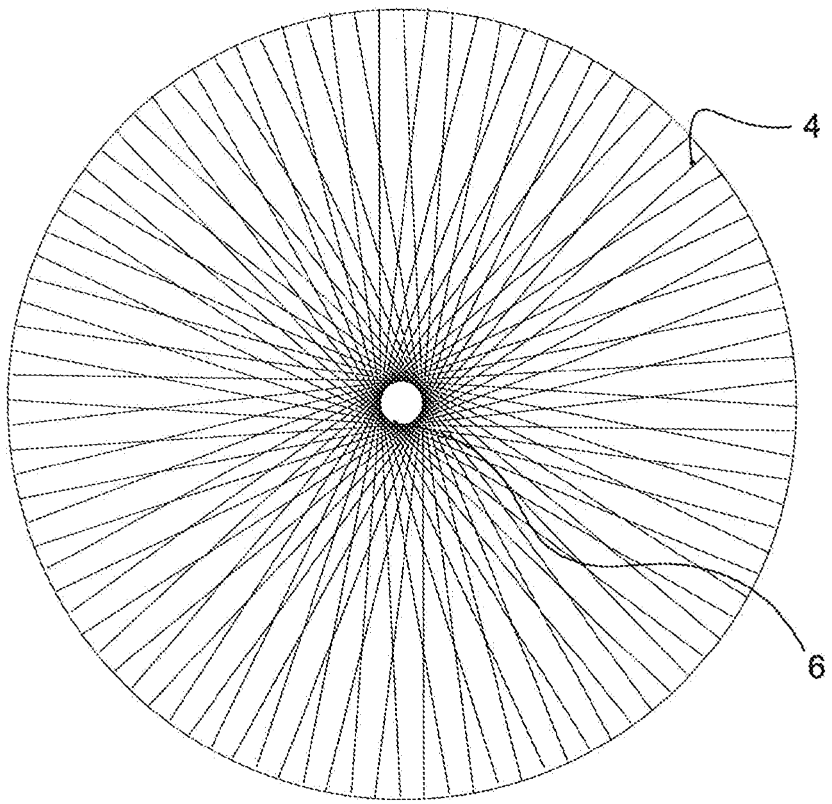
FIG. 2B shows a schematic top view of another reinforcement structure according to the invention showing fibers running from pole to pole leaving a polar opening.

FIG. 2A shows a schematic top view of a fiber reinforcement structure according to the invention. The fiber reinforcement structure comprises fibers 4 running from pole 5 to pole 5 substantially closing said poles 5. The poles 5 are located opposite to each other at the rotation axis of symmetry A. In FIG. 2B a schematic top view of another fiber reinforcement structure according to the invention is shown. Here, the fiber reinforcement structure comprises fibers 4 running from pole to pole leaving a polar opening 6.

Preferably, the fiber reinforcement structure of the bag is wound with a single or a multiple number of fibers, between opposite poles of the bag. The single or multiple number of fibers may be wound geodetically. Advantageously, multiple fibers, can be wound consecutively or simultaneously, e.g. using a manually controlled or automated filament winding equipment. The reinforcement fibers can for example be bundles of flat yarns or can have a cord construction. The reinforcement fibers can be rubberized and/or embedded in a rubber strip for preparing the process of forming a reinforcement layer structure. It is noted that, instead of continuously winding the fibers, another winding approach can be adopted, e.g. by winding the fiber reinforcement structure in an intermittent manner using separate fibers or strips of fibers embedded in rubber having a relatively short length, resulting in multiple beginnings and endings.

Figure 3A:
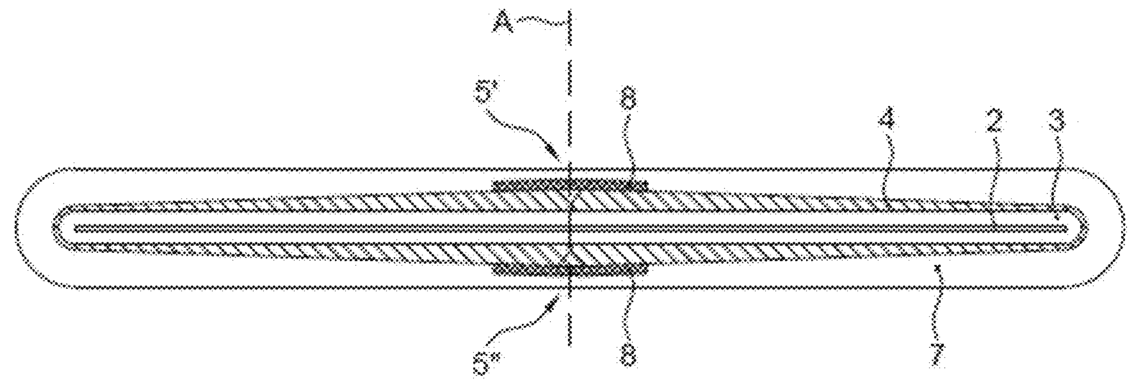
FIG. 3A shows a schematic cross-sectional view of a fiber reinforced inflatable bag shown in FIG. 1A.

By eliminating the metal closing elements, which are no longer needed since the polar openings are substantially closed by the fiber reinforcement structure, an inflatable structure having a small height, in its deflated state, can be realized FIG. 3A shows a schematic cross-sectional view of a fiber reinforced inflatable bag 1 with the fiber reinforcement structure substantially closing the poles shown in FIG. 2A. The bag 1 in FIG. 3A includes a sandwich structure wherein a first elastomer layer 3, also called elastomer liner, is covered by the single fiber layer 4. Then, a second elastomer layer 7 is applied on top of the single fiber layer 4 so that the fiber 4 is embedded in elastomer material forming a fiber reinforced layer structure 3, 4, 7. The fiber 4 is wound close to the poles 5', 5" substantially closing the poles 5', 5". Optionally, an additional reinforcement element 8 is applied underneath or on top of the fiber layer 4 for additional reinforcement of the poles 5', 5" and polar region. The additional reinforcement element 8 may be implemented as a textile reinforcement and/or may include a thin plate, e.g. 1-2 mm thick metal plate. The fiber reinforced structure 3, 4, 7 surrounds a compartment 2 that can be inflated and deflated, respectively, via the input port 9 shown in FIG. 1. In FIG. 3A the bag is shown in a deflated state wherein no or substantially no air or other gas is present in the compartment 2. The compartment 2 is surrounded by the elastomer liner 3 that is gas impermeable.

Figure 3B:
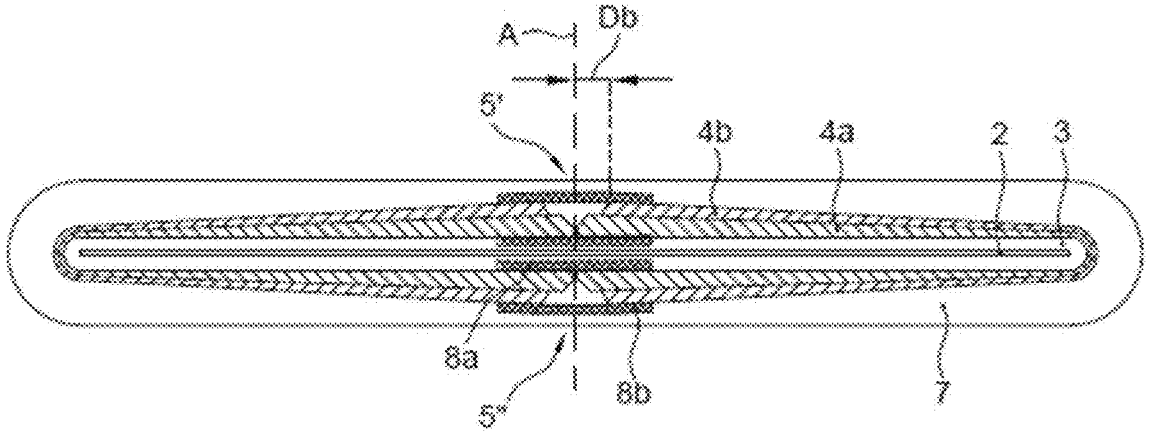
FIG. 3B shows a schematic cross-sectional view of a fiber reinforced inflatable bag having two fiber layers.

FIG. 3B shows a schematic cross-sectional view of a fiber reinforced inflatable bag 1. The fiber reinforcement structure comprises two layers of reinforcement fibers, the first interior layer 4*a* having a substantially closed pole and the second layer 4*b* leaving a polar opening. Here, a multiple number of fiber layers 4*a*, 4*b* are present, such that a bottom layer 4*a* is wound closer to a pole 5 than a top layer 4*b* covering the bottom layer 4*a*. Again, the fiber layers 4*a*, 4*b* are sandwiched between the elastomer liner 3 and the elastomer cover 7 for forming a fiber reinforced layer structure 3, 4, 7. Optionally, an elastomer layer could be added in between the fiber layers 4*a* and 4*b*. The fiber bottom layer 4*a* is wound close to the poles 5', 5" substantially closing the poles 5', 5". Further, the fiber top layer 4*b* is wound up to an offset distance Db to a bag pole 5. At the offset distance Db, the fiber top layer 4*b* surrounds a polar opening 6, at each of the poles 5', 5". The reinforcement cords can be spread over different polar openings in an integral manner, wherein the reinforcement cords are wound at the different polar openings in an alternating sequence. Alternatively, the reinforcement cords can be spread over different polar openings in a gradual manner, whereby the reinforcement cords are wound at increasingly larger polar opening per subsequent loop or subsequent number of loops. The reinforcement layer may have different polar openings on both sides of the bag. Optionally, one or more additional reinforcement elements 8*a*, 8*b* are applied underneath or on top of the fiber layers 4*a*, 4*b* in the polar region. By applying multiple fiber layers 4, polar openings may stepwise increase. As an example, two, three, four or even more fiber layers could be applied. Said polar openings can be additionally reinforced using additional reinforcement elements described above, however, such that the overall thickness of the reinforced layer structure is relatively small.

Figure 3C:
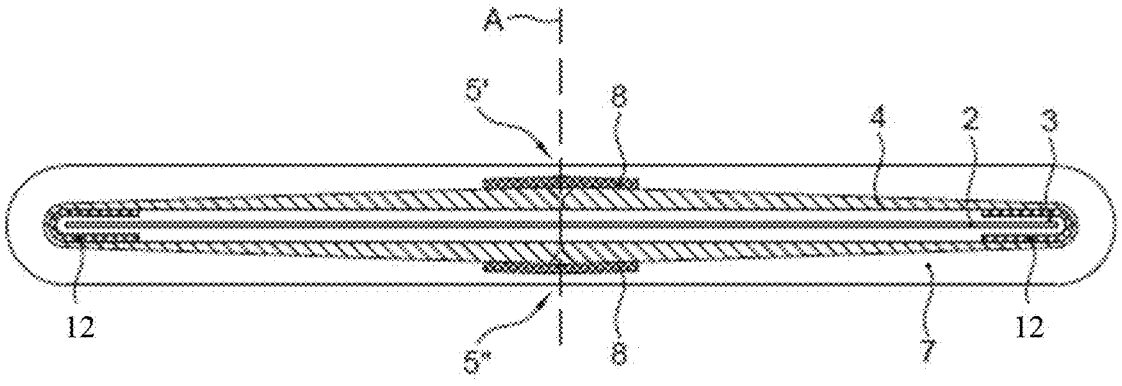
FIG. 3C shows a schematic cross-sectional view of a fiber reinforced inflatable bag shown in FIG. 1A comprising an element of prefabricated fiber reinforcement material in a peripheral region, extending towards the poles.

FIG. 3C shows a schematic cross-sectional view of a fiber reinforced inflatable bag 1 with the fiber reinforcement structure substantially closing the poles shown in FIG. 3A. Optionally, an additional reinforcement element 12 may be applied in the peripheral region underneath or on top of the fiber layer 4 for additional reinforcement of the peripheral region. The additional reinforcement element 12 may be implemented as a (prefabricated) textile reinforcement. Generally, the bags shown in FIGS. 3A, 3B and 3C include an inflatable reinforced elastomer body formed by the fiber reinforced layer structure 3, 4, 7.

Figure 4A:
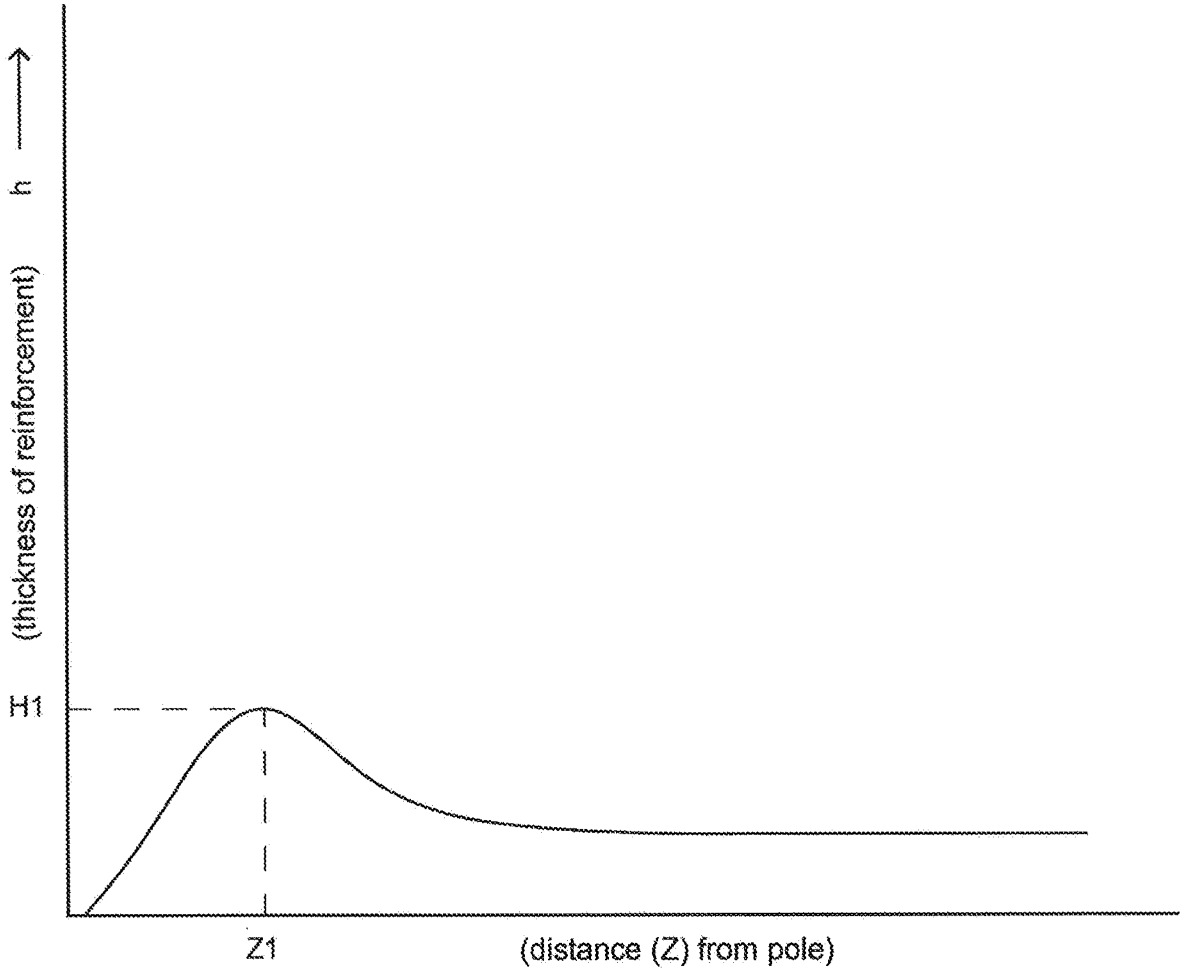
FIG. 4A is a graph which illustrates the thickness build-up of a reinforcement structure of a single reinforcement layer having substantially closed poles.

FIG. 4A is a graph which illustrates the thickness build-up of a reinforcement structure of a single reinforcement layer 4 having substantially closed poles 5. Here, the thickness h is depicted as a function of a distance z from the rotation axis of symmetry A. Starting with zero distance z, the graph has a maximum thickness $H_1$ at a distance z1. With increasing distance z, the thickness of the layer decreases until it reaches the minimum thickness of that layer. As a result, the maximum thickness build-up of the reinforcement structure has a value $H_1$.

Figure 4B:
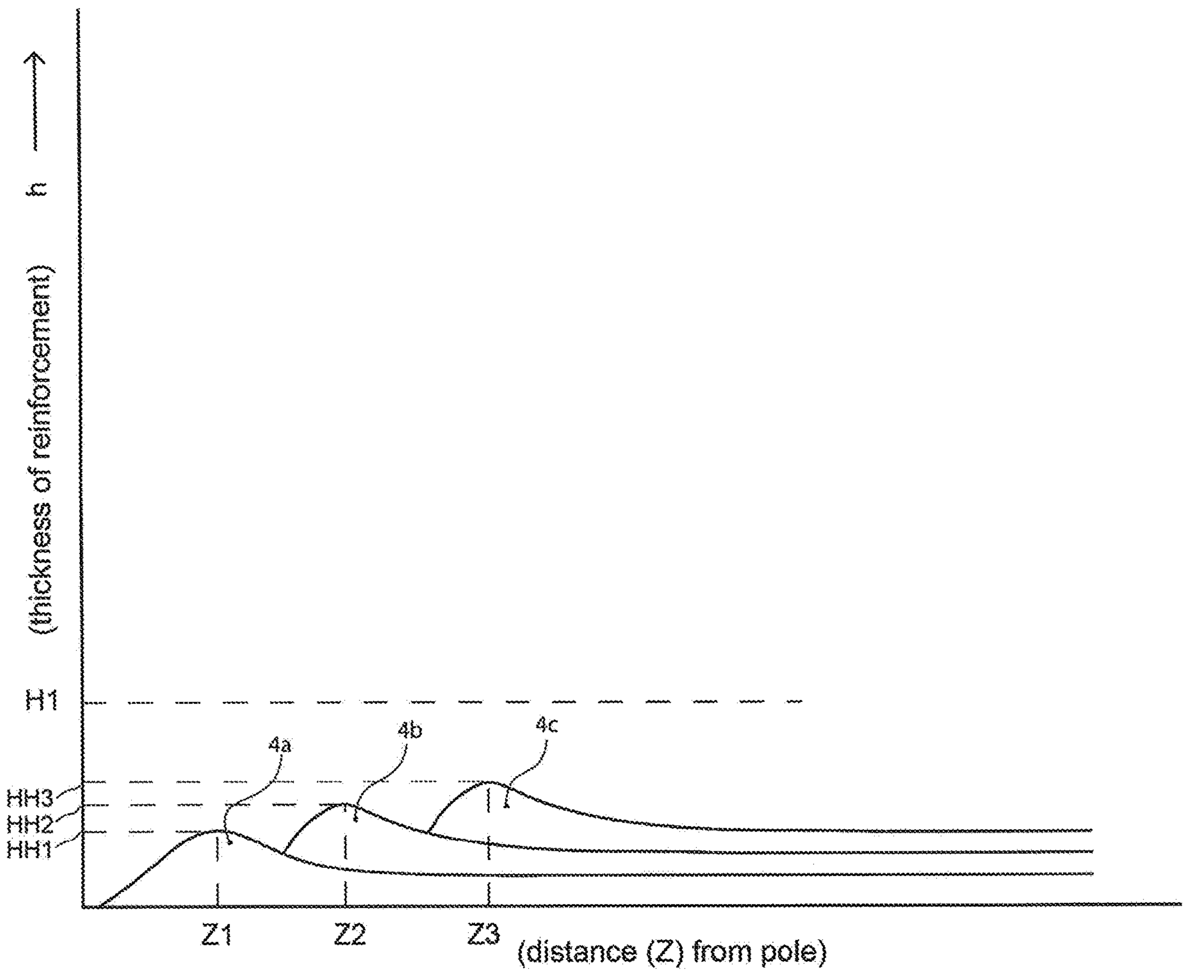
FIG. 4B is a graph which illustrates the thickness build-up of a reinforcement structure having three reinforcement layers, each layer having a different distance to a pole of the inflatable bag.

FIG. 4B is a graph which illustrates the thickness build-up of a reinforcement structure having three reinforcement layers, the fiber layers 4*a, b, c* surrounding a corresponding pole 5, wherein a first, bottom layer 4*a* forms a substantially closed pole, while a second layer 4*b* and a third layer 4*c* leave a polar opening 6 having a corresponding diameter. Preferably, the size of the respective polar openings 6, in other words the distance from the pole 5 to the fibers in a respective layer 4*b*, 4*c*, increases stepwise with each subsequent reinforcement layer. In the shown graph, a first local maximum thickness HH1 is reached due to the first bottom fiber layer 4*a* at a first distance $z_1$, a second local maximum thickness HH2 is reached at a first distance $z_2$ due to a second fiber layer 4*b* covering the first fiber layer 4*a*, and a third local maximum thickness HH3 is reached at a first distance $z_3$ due to a third fiber layer 4*c* covering the second fiber layer 4*b*. The third local maximum thickness HH3 is also a global maximum thickness that is smaller than the maximum thickness H1 resulting from the single reinforcement layer 4 shown in FIG. 4A, thus illustrating that a total build-up thickness can be reduced by dividing the reinforcement structure into multiple fiber layers spreading radially outwardly.

By spreading out the fiber build-up thickness in the polar area a more flattened surface in the polar region may be created when the bag is in its inflated state. Adding an additional reinforcement element 8 of a stiff material (e.g. thin metal plate) on top or underneath the fiber reinforcement layer 4 in the polar region will further enhance a more flattened surface in the polar region when the bag is in its inflated state. Having a more flattened surface in the polar region may be beneficial for providing a more stable lifting surface.

It is noted that, in principle, the fiber reinforcement structure has a generally rotationally symmetric geometry with respect to a rotation axis of symmetry A, but may also have another shape contour. Furthermore, the outer contour of the bag may have a rotation symmetric geometry, but may also have another shape contour. As an example, the outer contour of the bag may be rectangular, elliptical or polygonal, or circular while having one or more radially extending parts (e.g. handles) in the peripheral region.

FIGS. 5A-5F show different embodiments for the geometries of the reinforcement structure and contour of the bag. It will be understood that the possibilities are not restricted by the embodiments shown in FIGS. 5A-5F, and that many variants are possible.

Figure 5A:
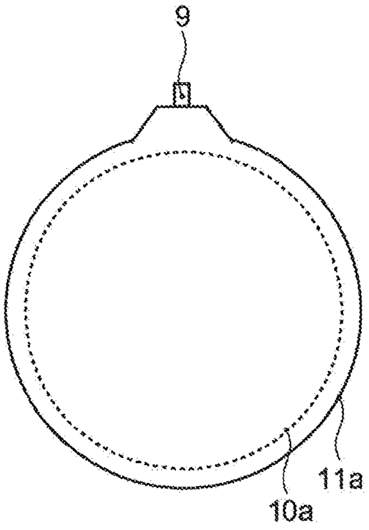
FIGS. 5A-5F show schematic views of different configurations of the contour of the fiber reinforcement structure and the outside contour of the bag.

FIG. 5A shows a schematic view of a fiber reinforcement structure having a rotation symmetric geometry 10*a* and comprising an outer contour of the product having a rotation symmetric geometry 11*a*. At the location in the peripheral region of the bag where the valve 9 is located, additional material may be added around the valve, providing a radially extended part supporting the valve.

Figure 5B:
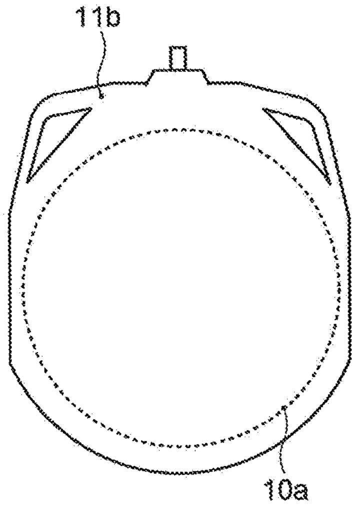

FIG. 5B shows a schematic view of a fiber reinforcement structure having a rotation symmetric geometry 10*a* and an outer contour of the product having a non-rotation symmetric geometry having radially extending parts 11*b*, providing handles for manipulation of the bag.

Figure 5C:
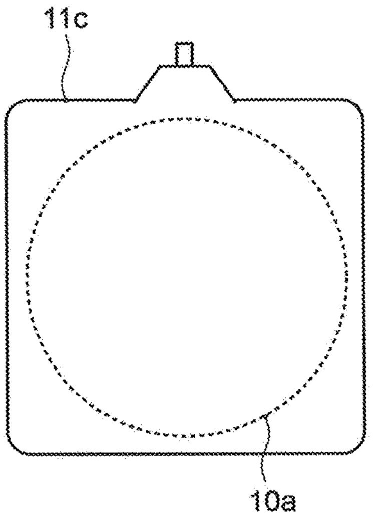

FIG. 5C shows a schematic view of a fiber reinforcement structure having a rotation symmetric geometry 10*a* and an outer contour of the product having a rectangular geometry 11*c*.

Figure 5D:
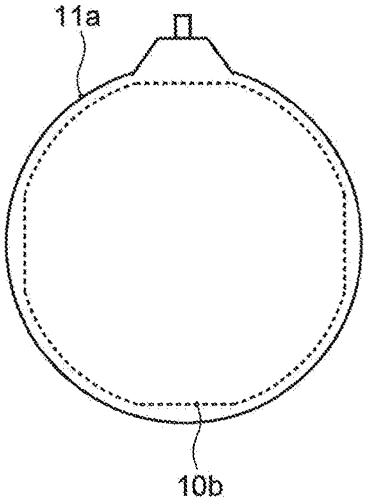

FIG. 5D shows a schematic view of a fiber reinforcement structure having a geometry which is non-rotation symmetric and comprises a contour shape consisting of circular sections and straight sections 10*b*, and having rotation symmetric outer contour of the bag 11*a*.

In another embodiment, both the contour of the reinforcement structure and the outer contour of the bag may have a non-rotation symmetric geometry.

Figure 5E:
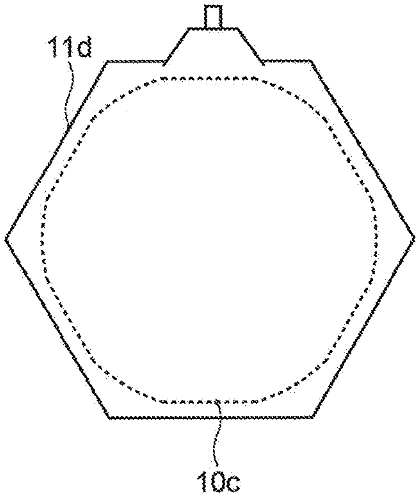

FIG. 5E shows a schematic view of a fiber reinforcement structure having a non-rotation symmetric geometry in the form of a hexagon with rounded corners 10*c* and an outer contour of the bag having a non-rotation symmetric geometry in the shape of a hexagon 11*d*.

Figure 5F:
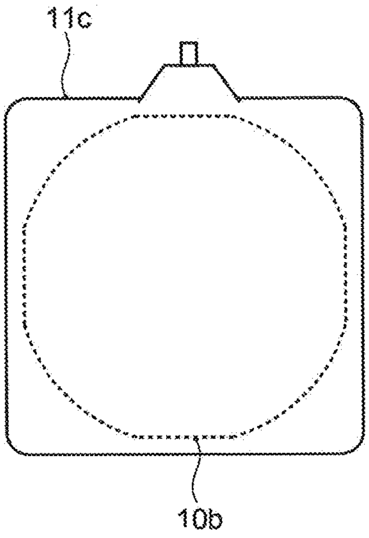

FIG. 5F shows a schematic view of a fiber reinforcement structure having a geometry which is non-rotation symmetric and comprises a contour shape consisting of circular sections and straight sections 10*b*, and an outer contour of the product having a rectangular geometry 11*c*.

The invention is not restricted to the embodiments described above. It will be understood that many variants are possible.

These and other embodiments will be apparent for the person skilled in the art and are considered to fall within the scope of the invention as defined in the following claims. For the purpose of clarity and a concise description features are described herein as part of the same or separate embodiments. However, it will be appreciated that the scope of the invention may include embodiments having combinations of all or some of the features described.

The invention claimed is:

1. An inflatable, fiber reinforced bag having a flat and generally round shape in an uninflated condition, the inflatable, fiber reinforced bag comprising:

at least one interior elastomer layer;

a fiber reinforcement structure covering the at least one interior elastomer layer, the fiber reinforcement structure being formed by a continuous winding of fibers between opposite poles of the bag substantially closing each pole of the opposite poles, wherein the fiber reinforcement structure comprises a plurality of fiber reinforcement layers forming a packet of layers, and wherein a first fiber reinforcement layer, of the plurality of fiber reinforcement layers, located closer to an interior side of the bag is wound closer to a pole, of the opposite poles, than a second fiber reinforcement layer, of the plurality of fiber reinforcement layers, located more remote from the interior side of the bag;

an exterior elastomer layer covering the fiber reinforcement structure; and an inflation valve unit penetrating the at least one interior elastomer layer, the fiber reinforcement structure and the exterior elastomer layer.

2. The inflatable, fiber reinforced bag according to claim 1, wherein a third fiber reinforcement layer, of the plurality of fiber reinforcement layers, located closest to the interior side of the bag is wound closest to the pole, of the opposite poles, and a fourth fiber reinforcement layer, of the plurality of fiber reinforcement layers, located, more remotely from the interior side of the bag is positioned further away from the pole than the third fiber reinforcement layer.

3. The inflatable, fiber reinforced bag according to claim 1, further comprising an intermediate elastomer layer sandwiched between subsequent fiber reinforcement layers, of the plurality of fiber reinforcement layers, of the fiber reinforcement structure.

4. The inflatable, fiber reinforced bag according to claim 3, wherein at least one of said at least one interior elastomer layer, said intermediate elastomer layer, or said exterior elastomer layer has been vulcanized onto the fiber reinforcement structure.

5. The inflatable, fiber reinforced bag according to claim 1, further comprising an additional reinforcement element near at least one of the opposite poles.

6. The inflatable, fiber reinforced bag according to claim 1, further comprising an element of prefabricated fiber reinforcement material in a peripheral region, extending towards the opposite poles.

7. The inflatable, fiber reinforced bag according to claim 1, wherein the fiber reinforcement structure has a rotation symmetric geometry, and an outer shape of the bag has a non-rotation symmetric geometry.

8. The inflatable, fiber reinforced bag according to claim 1, wherein the bag has a generally rotation symmetric shape, and wherein the bag is provided, in a peripheral region with at least one radially extending part, providing at least one additional functionality.

9. The inflatable, fiber reinforced bag according to claim 8, wherein the at least one additional functionality comprises a handle configured for manipulation of the bag.

10. The inflatable, fiber reinforced bag according to claim 1, wherein the fiber reinforcement structure has a non-rotation symmetric shape.

11. The inflatable, fiber reinforced bag according to claim 10, wherein the non-rotation symmetric shape comprises one of a closed contour comprising circular portions and substantially straight sections interconnecting subsequent circular portions or a polygon contour.

12. An inflatable, fiber reinforced bag having a flat and generally round shape in an uninflated condition, the inflatable, fiber reinforced bag comprising:

at least one interior elastomer layer;

a fiber reinforcement structure covering the at least one interior elastomer layer, the fiber reinforcement structure being formed by a continuous winding of fibers between opposite poles of the bag substantially closing each pole of the opposite poles, wherein the fiber reinforcement structure comprises a plurality of fiber reinforcement layers forming a packet of layers and an intermediate elastomer layer sandwiched between subsequent fiber reinforcement layers, of the plurality of fiber reinforcement layers:

an exterior elastomer layer covering the fiber reinforcement structure; and an inflation valve unit penetrating the at least one interior elastomer layer, the fiber reinforcement structure and the exterior elastomer layer.

13. The inflatable, fiber reinforced bag according to claim 12, wherein at least one of said at least one interior elastomer layer, said intermediate elastomer layer, or said exterior elastomer layer has been vulcanized onto the fiber reinforcement structure.

* * * * *